Figure 3:
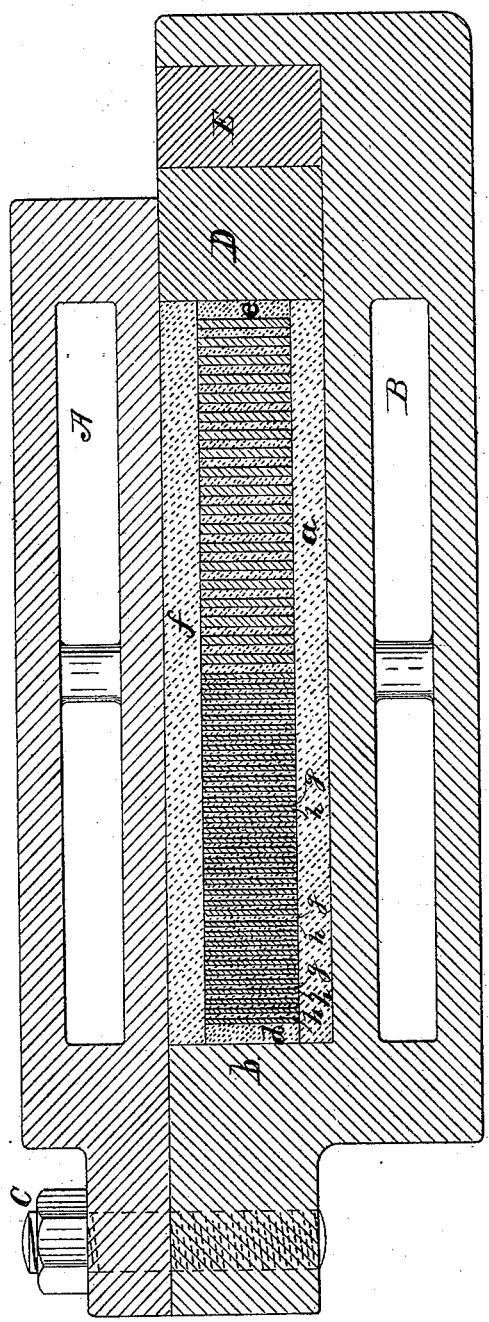

(No Model.)   3 Sheets—Sheet 1.
J. W. HYATT.
MANUFACTURE OF COMBS FROM CELLULOID AND OTHER PLASTIC MATERIAL.
No. 299,389. Patented May 27, 1884.
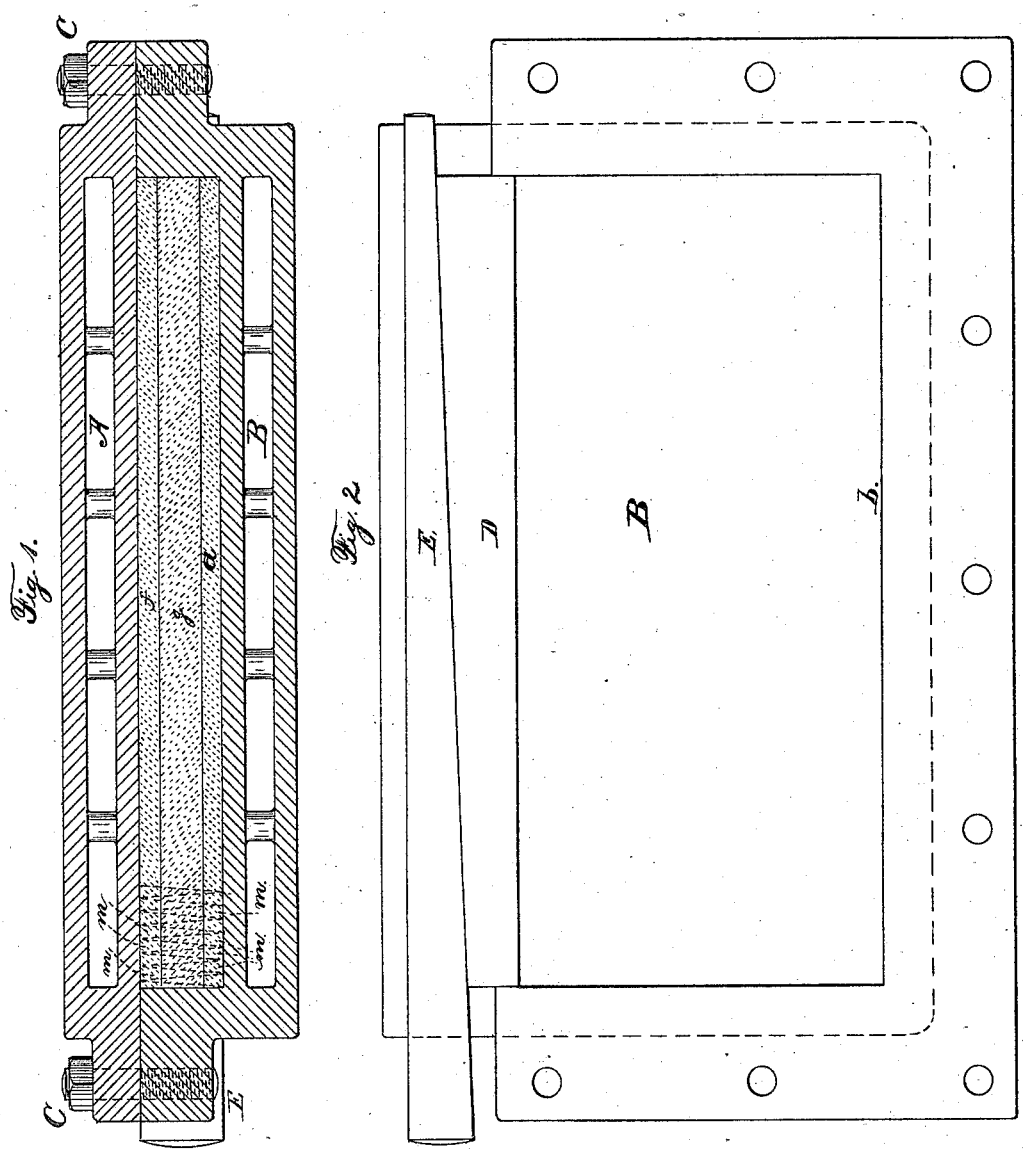
WITNESSES:
Herman Gustow
J. H. Chilton
INVENTOR
John W. Hyatt,
BY
Chas. E. Gill
ATTORNEY
N. PETERS. Photo-Lithographer, Washington, D. C.

(No Model.) 3 Sheets—Sheet 2.

J. W. HYATT.
MANUFACTURE OF COMBS FROM CELLULOID AND OTHER PLASTIC MATERIAL.

No. 299,389. Patented May 27, 1884.

WITNESSES:
Herman Gustow
J. H. Chilton

INVENTOR
John W. Hyatt,
BY
Chas. O. Gill
ATTORNEY

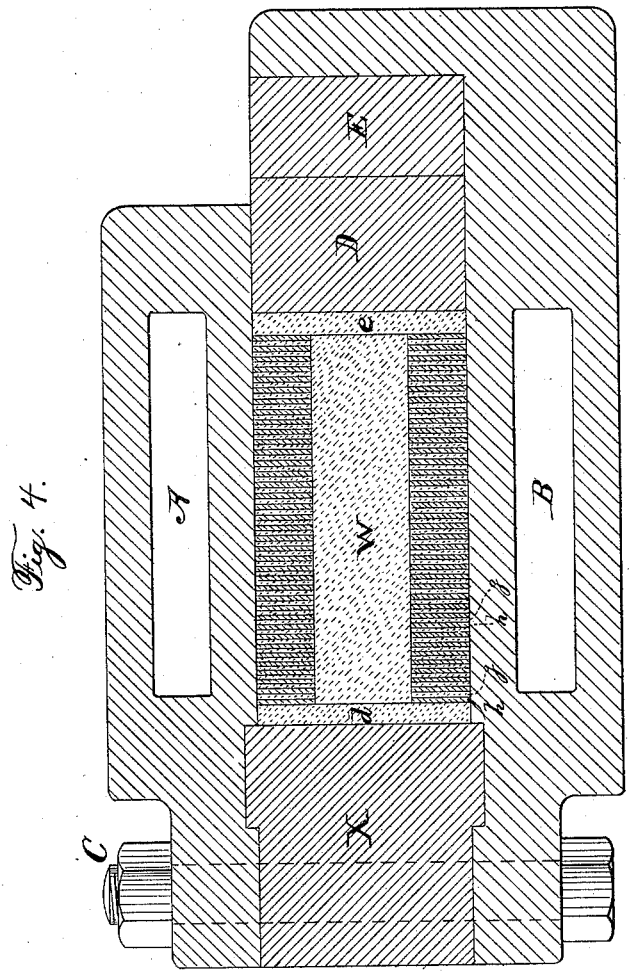

UNITED STATES PATENT OFFICE.

JOHN W. HYATT, OF NEWARK, NEW JERSEY, ASSIGNOR TO THE CELLULOID MANUFACTURING COMPANY, OF NEW YORK, N. Y.

MANUFACTURE OF COMBS FROM CELLULOID AND OTHER PLASTIC MATERIAL.

SPECIFICATION forming part of Letters Patent No. 299,389, dated May 27, 1884.

Application filed April 23, 1884. (No model.)

*To all whom it may concern:*

Be it known that I, JOHN W. HYATT, a citizen of the United States, and a resident of Newark, in the county of Essex and State of New Jersey, have invented certain new and useful Improvements in the Manufacture of Combs from Celluloid and other Plastic Material, of which the following is a specification.

The invention relates to improvements in the manufacture of combs from celluloid or other plastic material; and it consists in a certain novel process and apparatus, hereinafter described, whereby combs of plastic material may be manufactured rapidly, economically, and of uniform size without the aid of the dies and saws for cutting the teeth heretofore employed, and with but a trifling amount of hand-labor and loss of material.

One of the principal objects accomplished by the invention is the formation of all the teeth of the comb at one operation. In the process hereinafter described the back and teeth, prior to their introduction into the mold or die, are in separate pieces; but while the die is under heat and pressure the pieces of the material constituting the teeth of the comb are welded to the back, so that the production is a comb the teeth of which are all formed and united to the back at a single operation. The character of the process is such that combs of any desired style or appearance may be produced, and when the comb is completed the point at which the teeth are welded to the back is not observable, nor does it detract in any way from the value of the article. By means of the process hereinafter described fine and coarse toothed combs may be produced with equal facility, as well as those which have fine teeth at one end and coarse at the other. The thickness of the teeth and the width of the spaces between them are matters wholly within the control of the manufacturer, and may be regulated at will.

In the accompanying drawings I illustrate a simple apparatus whereby the invention may be practiced; but I do not, of course, confine myself to its employment exclusively, since it is only one of many forms of apparatus which may be readily devised for accomplishing a like purpose.

In the drawings, Figure 1 is a central vertical longitudinal section of the apparatus, the plastic material being shown in position therein. Fig. 2 is a plan view of the lower section of same. Fig. 3 is a central vertical transverse section of the apparatus and inclosed material; and Fig. 4 is a transverse section of a slightly-modified form of apparatus, showing the material arranged for the production of fine-toothed combs.

The upper and lower sections of the apparatus (lettered A B, respectively) are steam-tables, and are adapted to be held in face to face contact by bolts C. The lower steam-table constitutes a receptacle to receive the plastic material, and the upper serves as a platen or press to compact and retain the same, while the strips or pieces thereof are being welded together by heat and pressure. The steam-table B is provided at one end with a follower, D, and a driving-key, E, the purpose of which will be hereinafter explained.

In practicing my process, in the production of a coarse-toothed comb, or a comb having coarse teeth at one end and fine at the other, I first lay in the lower steam table or receptacle, B, a sheet of celluloid or other plastic material, (lettered *a*,) snugly fitting the inner walls thereof, and of a thickness about equal to the depth of the back of a comb. I then place a strip of material of proper thickness to form the large end teeth of a comb against the wall *b* of the receptacle, and the follower D, the lower edge of these strips (lettered *d* and *e*) resting upon the sheet of material previously placed in the receptacle, and I thereafter arrange in alternate layers against the strip *d* thin strips of wood, *h*, and celluloid, *g*, which extend transversely across the receptacle and rest upon the sheet of material *a*. In arranging these alternate layers of wood and celluloid I, commence by placing in position a strip of wood about equal in thickness to the space between two of the teeth of a comb, and then lay against the strip of wood a strip of celluloid equal in thickness to that of the tooth of a comb, after which another strip of wood and then a strip of celluloid are arranged in position, and so on until the space between the strips *d e* has been entirely filled. After this I place a sheet of plastic material, *f*, upon the end pieces, *d e*, and the alternate layers of wood and celluloid, which sheet will correspond in size with the sheet *a*, and fill the receptacle. The thickness of the separate pieces of material within the receptacle will vary according to the size of the comb and the spaces between the teeth thereof.

It will appear obvious, without an explanation, that to form thick teeth and wide spaces in the comb it will only be necessary to employ alternate pieces of wood and strips of celluloid of appropiate thickness.

In Fig. 3 I illustrate an arrangement of the alternating strips of wood and celluloid which will result in a comb being produced having fine teeth at one end and coarse at the other. After the sheet of material *f* has been placed upon the vertical strips of material, the platen or top steam-table, A, is placed upon the receptacle and firmly secured thereto by bolts C, the follower D being also pressed inward by tapping on the thickened end of the key E, in order that the material within the receptacle may be firmly held in position. The operation of the upper platen and the follower D serves to firmly compact the strips of material, whereby, when steam is admitted to the upper and lower tables, the edges of the strips *d e*, and of the smaller strips *g*, which alternate with the strips of wood *h*, will weld together, the whole being in substantially the position indicated in Fig. 3. In order to facilitate this welding, the pieces of celluloid which come in contact with each other may, if desired, be treated with a solvent. The product of the steam-tables will be a form or block of material of which the pieces *a f d e* will form the top and bottom and sides, and these will inclose the smaller strips of the material *g* and wood *h*, the upper and lower edges of the material *g* being welded to the opposite sheets, *a f*. The material after having been welded into this form is cooled while in the receptacle, the follower D, during the cooling operation, being moved slightly inward by means of the key E to compensate for any contraction which may take place in the material. After the block of material has been removed from the receptacle B, it will be cut into wedge-shaped pieces *m*, extending the full length of the block, the lines upon which the pieces will be cut being indicated by dots in Fig. 1. Each of the pieces *m*, when cut from the block, will form, when the wood has been slipped from between the strips of material *g*, a complete comb. The piece *m*, after having been cut and the wood removed, may be polished and its angular edges rounded by the ordinary polishing-wheel, when the comb will be ready for use. The facility with which combs may be manufactured according to the process set forth will appear obvious. It will be noted also that the entire block of material may be formed into combs with but a trifling amount of waste.

In Fig. 4 I illustrate the method of arranging the pieces of material for the manufacture of fine-toothed combs. The apparatus shown in Fig. 4 is substantially the same as that illustrated in the other figures of the drawings, the only difference being that in the former the side of the receptacle opposite to the follower D, and lettered X, is made detachable, as shown, this construction being advantageous in that it may facilitate the removal of the block or form of material from the receptacle.

In the arrangement of the material for fine-toothed combs, I employ the strips of thick material *d e* for the large end teeth of the comb, as in the process hereinbefore described, and also the alternate strips of wood and celluloid lettered *g h*, respectively, for the teeth and the spaces between them; but in this instance I arrange the strips *g h* on opposite sides of a thick piece of plastic material, W, to which the strips *g*, forming the teeth, weld under the application of heat and pressure, and which constitutes the solid central part of the comb. The block of material arranged for the manufacture of fine-toothed combs is clearly illustrated in Fig. 4, and it may be cut into strips each to form a comb (as is also true of the block of material shown in Fig. 3) by a saw, preferably a band-saw, or by means of a planing-machine, substantially such as that illustrated in Letters Patent granted to my assignee February 5, 1878, and numbered 199,908, or by other suitable means.

I do not limit myself, as aforesaid, to the employment of the apparatus hereinbefore described; nor do I confine myself to the employment of the strips of wood to form the spaces between the teeth of the comb, since various other substances may be substituted therefor with good results. I make use of strips of wood for convenience and economy, and they may be employed with satisfactory results; but in lieu of wooden strips the manufacturer may make use of metal strips for the purpose of forming the spaces between the teeth of the comb, in which employment, prior to cutting the block of material into pieces, (or combs,) the metal strips must of course be withdrawn.

In the specification and claims I have made use of the term "longitudinal" in referring to the position of the material forming the teeth and the spaces between the teeth of the comb, and the term "transverse" as describing the lines upon which the strips *m* are cut from the block or form. By "longitudinal" I mean that the strips *g h* extend longitudinally with the length of the apparatus shown, or, in other words, parallel with the pieces D' and D, and the word "transverse" is employed to denote that the strips *m* are cut transversely to the length of the pieces D' D.

What I claim as my invention, and desire to secure by Letters Patent, is—

1. The method hereinbefore described of manufacturing combs of plastic material, which consists in uniting the teeth thereof to the back by the application of heat and pressure.

2. The method hereinbefore described of manufacturing combs of plastic material, which consists in providing separate pieces for the back teeth and ends and uniting them by heat and pressure.

3. The method hereinbefore described of manufacturing combs of plastic material, which consists in welding into a block form pieces of the material appropriately arranged to constitute the teeth, ends, and back of the comb, and then cutting therefrom strips or pieces approximating to the contour of a comb.

4. The method hereinbefore described of manufacturing combs of plastic material, which consists, first, in preparing a form consisting of four outer walls of the material inclosing longitudinal alternating layers of the material and a foreign substance; second, cutting from said form transverse strips approximating to the contour of a comb; and, third, removing the pieces of foreign substance from the strips.

5. The apparatus hereinbefore described, consisting of the platen A, receptacle B, and follower D, the parts A B being in the nature of steam-tables.

Signed at New York, in the county of New York and State of New York, this 15th day of April, A. D. 1884.

JOHN W. HYATT.

Witnesses:
CHAS. C. GILL,
HERMAN GUSTOW.